No. 704,517. Patented July 15, 1902.
D. S. COLE.
BUTCHER'S SAW FRAME.
(Application filed Oct. 8, 1901.)
(No Model.)
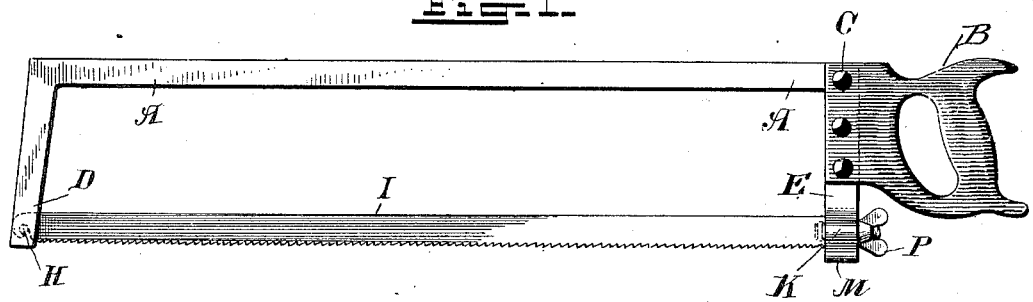
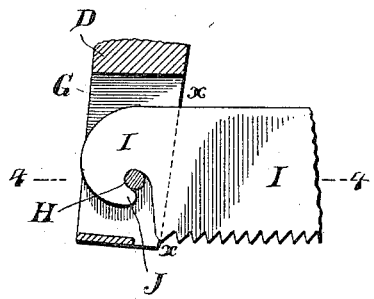
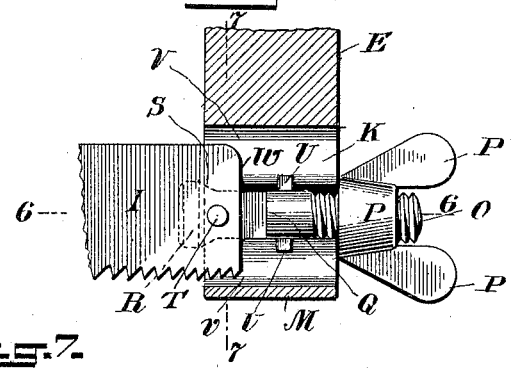
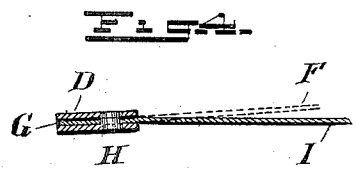
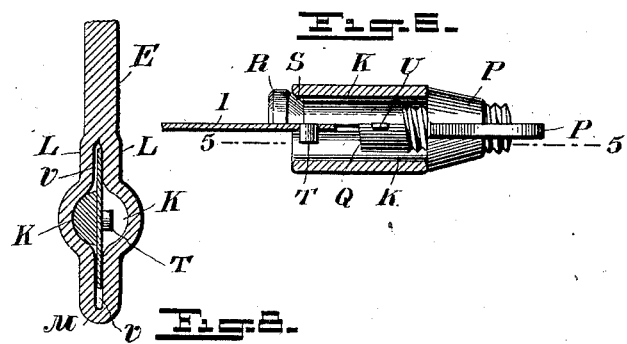
WITNESSES:
Geo. W. Baylors
Edgar R. Mead.
INVENTOR
Dwight S. Cole.
BY
Phillips Abbott
his ATTORNEY

UNITED STATES PATENT OFFICE.

DWIGHT S. COLE, OF BROOKLYN, NEW YORK, ASSIGNOR TO THE NEW YORK STATE SAW FILERS ASSOCIATION, OF BROOKLYN, NEW YORK, A CORPORATION OF NEW YORK.

BUTCHER'S SAW-FRAME.

SPECIFICATION forming part of Letters Patent No. 704,517, dated July 15, 1902.

Application filed October 8, 1901. Serial No. 77,957. (No model.)

*To all whom it may concern:*

Be it known that I, DWIGHT S. COLE, a citizen of the United States, and a resident of Brooklyn, in the county of Kings and State of New York, (having my post-office address at No. 262 Washington street, Brooklyn, New York,) have made certain Improvements in Butchers' Saw-Frames and Saws, of which the following is a description, reference being had to the accompanying drawings, in which—

Figure 1 illustrates an elevation of a saw and frame complete with the saw in position. Fig. 2 shows an edgewise view looking upwardly, as shown in Fig. 1. Fig. 3 illustrates a detail, partly in section, of the hook of the saw and the fastening-pin at the toe end of the frame. Fig. 4 illustrates a detail of the toe end of the frame and saw, showing the angular twist of the frame for the purpose of preventing chattering. Fig. 5 is a detail, partly in section, of the wing-nut and bolt for giving tension to the saw, located at the heel end of the frame. Fig. 6 is a plan view, partly in section, of the parts shown in Fig. 5. Fig. 7 is a front sectional elevation of the bolt and coacting parts at the heel of the frame. Fig. 8 is a detail showing the method of constructing the socket for the wing-nut and bolt at the heel end of the frame.

As the result of extensive experience in the subject-matter of this invention I have discovered that butchers' saws and the frames with which they are to coact as now and heretofore constructed are very inconvenient and imperfect in several particulars.

First. The frames are unnecessarily expensive.

Second. The means of connecting the saw with the frame are in some instances complicated, in others difficult of operation, in others insecure, in others perishable, in others imperfect in alinement.

Third. The saws are exceedingly apt to "chatter," as it is called, when in use—that is to say, although ordinarily stretched tightly enough in the frame they are not held laterally therein with sufficient rigidity. Consequently owing to the looseness of the fastening means the saws are capable of independent movement relative to the frames.

Fourth. The construction of the parts is such that during the introduction and removal of a saw from its frame the parts necessarily become detached, and being relatively small they are apt to become misplaced or drop to the floor or otherwise lost, which occasions great inconvenience.

The purpose of this invention, therefore, is to correct the above defects in the art as it now exists and to afford a relatively inexpensive, easily-operated, durable, and efficient implement in which the parts will not become detached and in which the saw when in operative engagement with its frame will be held immovably.

A is the frame of the saw; B, the handle. They are connected by the usual devices C or in any other suitable manner.

D is the toe of the frame; E, the heel. The toe and heel sections—to wit, the ends of the frame—are preferably made of separate pieces of steel and electrically welded to the back; but this forms no essential part of the invention. The extreme end of the toe D is twisted slightly relative to the plane of the rest of the frame, as shown best in Fig. 4, so that the saw-blade if projected straight to the rear on the same plane as that of the twisted extremity would lie at an angle relative to the plane of the back of the frame, as shown by dotted lines F in said figure. The end of the toe is slotted, as shown at G, and there is a cross-pin H extending from side to side across the slot. The slot is of course wide enough to easily receive the end of the saw-blade I. (See Fig. 3.)

J is a hook on the end of the saw-blade. It is made heavy and strong at its upper part, and the throat of the hook, within which the pin H rests, (see Fig. 3,) is preferably arranged about midway of the width of the saw-blade. The vertical height of the slot is such that during the introduction of the blade the point of the hook may pass above this pin and drop down behind it, and the construction and location of the slot and the pin and the hook are such that when the saw-blade is in engagement and in operative condition the total width of the blade, as shown at X X, Fig. 3, shall be within and take a bearing upon the sides of the slot.

The clamping devices at the heel of the saw are made as follows, special reference being had to Figs. 5, 6, 7, and 8: A piece of bandsteel is fashioned into the shape shown in Fig. 8, having the two semicircular and transverse grooves K K and immediately outside of them the two semishoulders L L. The piece when in this shape is folded upon itself, as indicated by the arrow at M. The two extremities being bent upwardly form the socket for the tension-bolt, as shown in Fig. 7. The upper extremities N N of the piece of metal are then electrically welded or otherwise connected to the heel-piece E of the frame. This work being nicely done with suitable mechanical appliances, all subsequent machine-work is unnecessary. O is the tension-bolt, threaded on its end, as shown, and provided with threaded wing-nut P. The bolt is halved at its forward end, producing the shoulders Q, and has a half-head R with a beveled surface S at its base and a pin T centrally located, which is adapted to pass through a hole made in the end of the saw-blade. U is a cross-pin rigidly connected with the bolt, projecting at opposite sides thereof, and which enters the narrow slots or cavities V V (see Fig. 7) above and below the cylindrical portion of the socket formed by the half-round parts K K. The top and bottom edges of these recesses V V are so far separated as to permit of the entrance into them of the rear or heel end W of the saw-blade.

The foregoing, although a novel construction, seems simple enough until the purpose and results secured by the peculiar construction are explained. Then the value thereof appears.

I have already referred to certain features of economy in the construction. There are others which need not be specifically referred to. I wish to call attention, however, to the following:

First. The construction of the socket at the heel of the frame is such that no machine-work is necessary—that is to say, the cylindrical recess for the receipt of the body of the bolt O is made without boring, and the recesses V V above and below, which receive the cross-pin U and the end of the saw-blade, are likewise made without any machine-cutting or other expensive work. The pin U, fitting into these recesses in rear of the end of the saw, prevents rotation of the bolt O. The beveled surface S on the half-head of the bolt as it and the saw are drawn back by the wing-nut engages with the side of the socket and crowds the bolt and the saw with it in the opposite direction, so that the side of the end of the saw, which by this time has entered the slots V V, is pressed hard against the side of the socket across the full width of the blade, so that when the parts have attained their ultimate position the saw is clamped as rigidly as though in a vise.

Second. The arrangement and relative size of the parts are such that during the loosening of the saw for removal and substitution of another one the wing-nut will never run back far enough to run off the end of the bolt, because the pin T and the rear end of the saw-blade will always be exposed beyond the front edge of the heel before the wing-nut escapes from the end of the bolt. Therefore there will never be any occasion for separation or dismemberment of these parts, and since there is no separable part excepting the bolt and the wing-nut, and since they will always retain their position within the socket, there is no probability of the parts ever becoming separated or lost.

Third. The improvements at the toe end are equally desirable—that is to say, because of the twist given to the end of the toe, so that the slot through it lies at a slight angle from the general plane of the frame, the saw-blade when the strain comes upon it is carried over to the lower side of the slot, as seen in Fig. 4, and as the strain increases it is hugged hard against that edge of the slot throughout its entire width. By this means rigid contact is maintained at this point between the blade and the frame, so that chattering is prevented.

It will be obvious to those who are familiar with this art that modifications may be made in certain of the details of construction without departing from the essentials of the invention. I therefore do not limit myself to the details.

Having described my invention, I claim—

1. In a saw-frame a socket at the heel end of the frame having a cavity adapted to receive the end of the saw, a bolt adapted to work in the socket, a cross-pin on the bolt engaging with the socket to prevent rotation, a wing-nut to give tension to the bolt, a pin on the bolt, and a beveled surface at one side of the forward end of the bolt, for the purposes set forth.

2. In a saw-frame a slot at the front end of the toe of the frame, the plane whereof is at an angle relative to the general plane of the frame, and means to hold the front end of the saw within the slot, for the purposes set forth.

3. In a saw-frame a socket at the heel end of the frame having a substantially cylindrical opening, a slot above and below said opening adapted to receive the end of the saw-blade, a bolt having a beveled surface at one side of its front end and means for holding the saw, and a wing-nut threaded to the bolt.

4. In a saw-frame a socket at the heel end of the frame having a substantially cylindrical opening, a slot above and below said opening adapted to receive the end of the saw-blade, a bolt provided with a beveled surface at one side of its front end, means to hold the saw, and means to prevent rotation of the bolt, and a wing-nut threaded to the bolt.

5. In a saw-frame a socket for the heel of the saw made of a piece of strip-steel formed half and half substantially as shown in Fig. 8, then bent upon itself, whereby a central cylindrical recess with a slot above and below is produced without machine-work.

6. The combination of a saw-frame, devices at or near its ends for holding the saw in proper vertical alinement with the frame and for applying tension thereto, whereby when the tension is applied the saw automatically moves into rigid engagement with the sides of the saw-frame.

7. In a saw-frame a tension device embodying a threaded bolt, the bolt having a beveled surface at one side adapted to engage with one side of the socket in which it works, and a cavity in the socket adapted to receive the end of the saw whereby the saw-blade when under tension is crowded against the opposite side of said socket.

Signed at Brooklyn, in the county of Kings and State of New York, this 4th day of October, 1901.

DWIGHT S. COLE.

Witnesses:
PHILLIPS ABBOTT,
DANIEL W. MARTIN.